United States Patent Office 3,093,017
Patented June 11, 1963

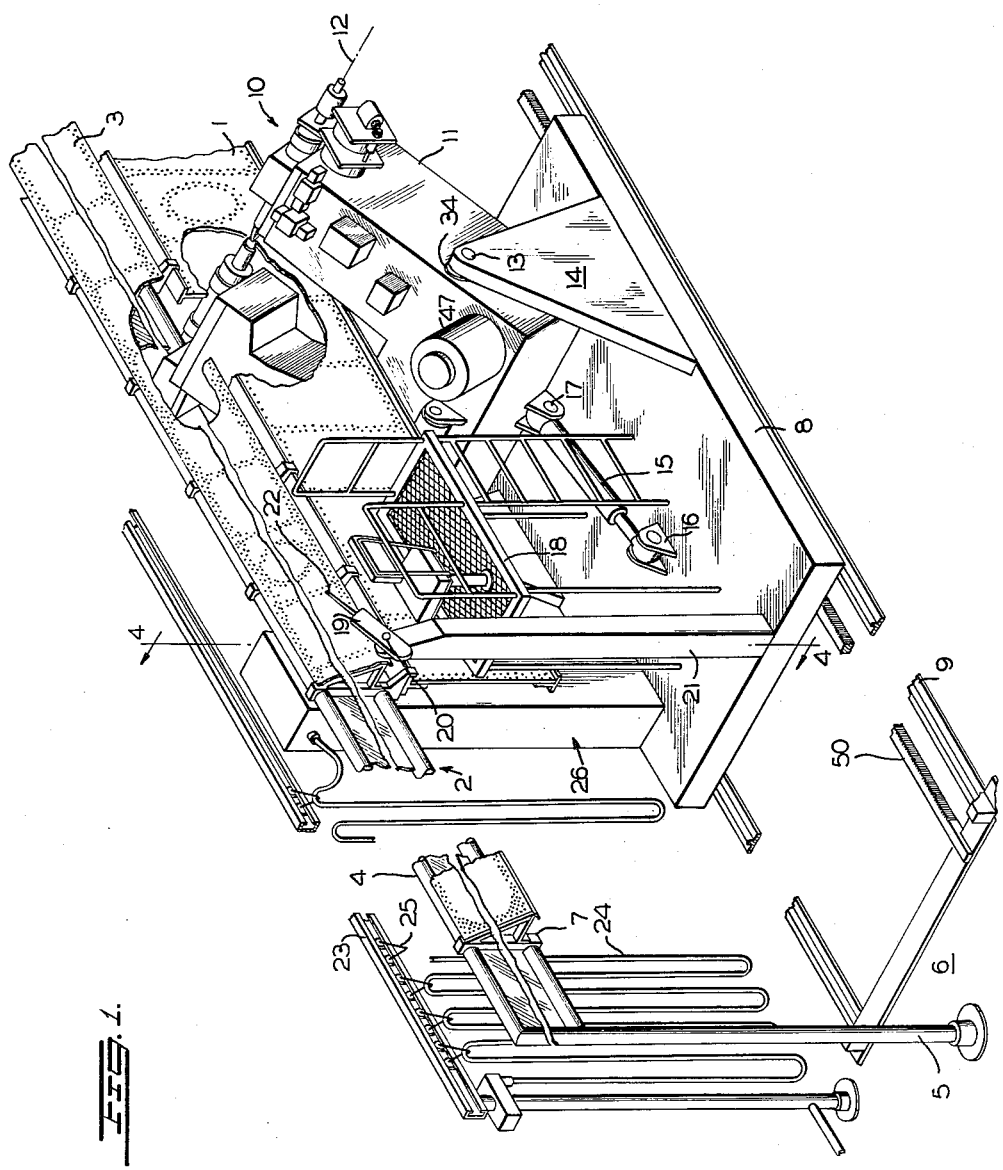

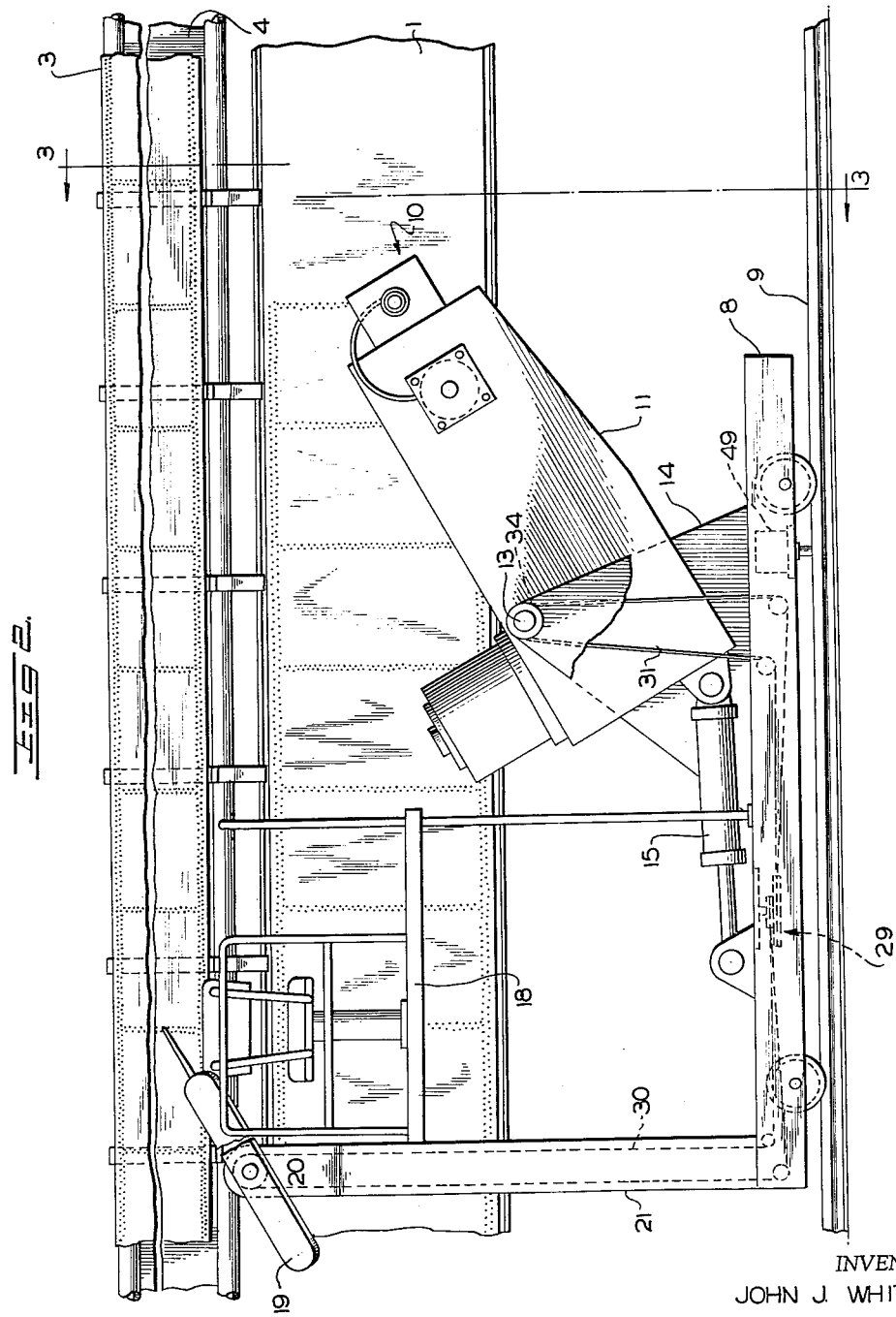

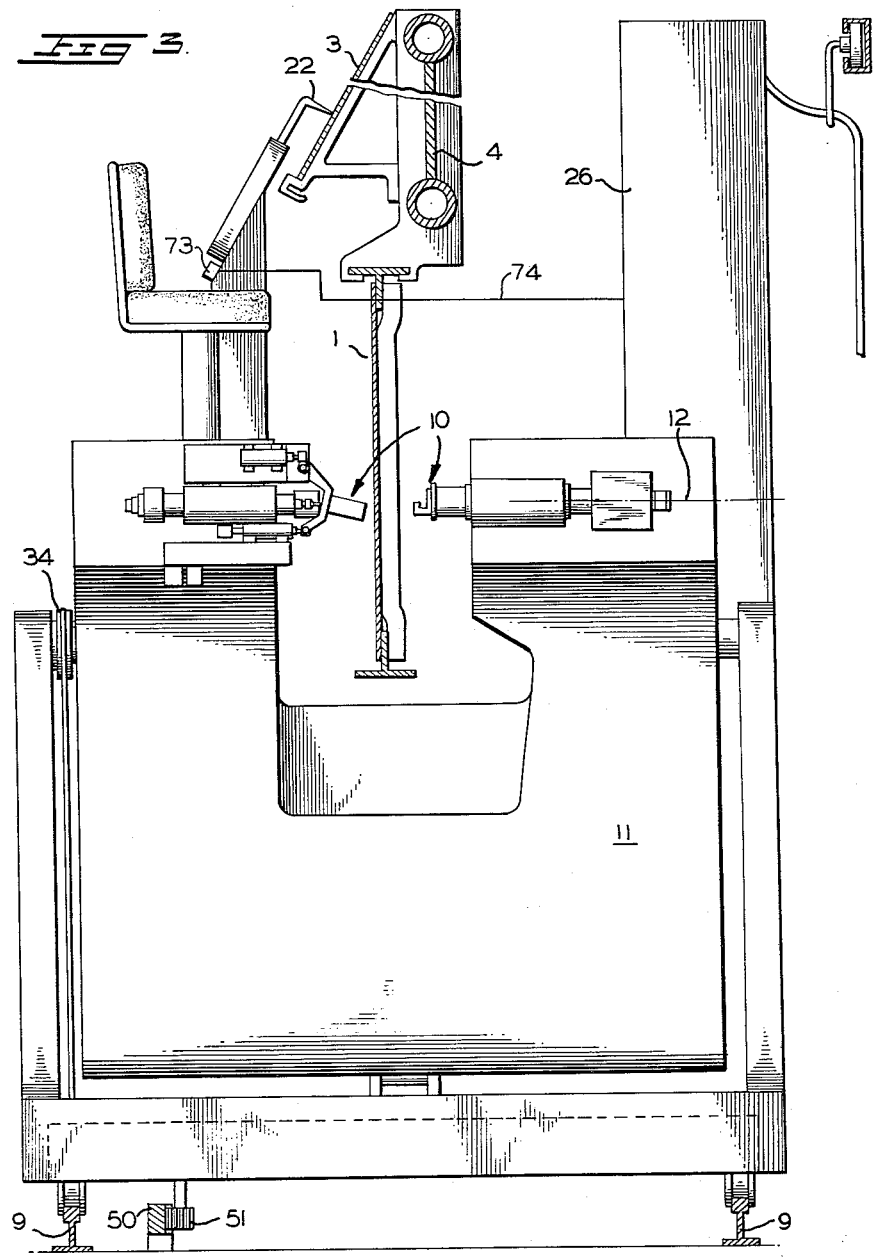

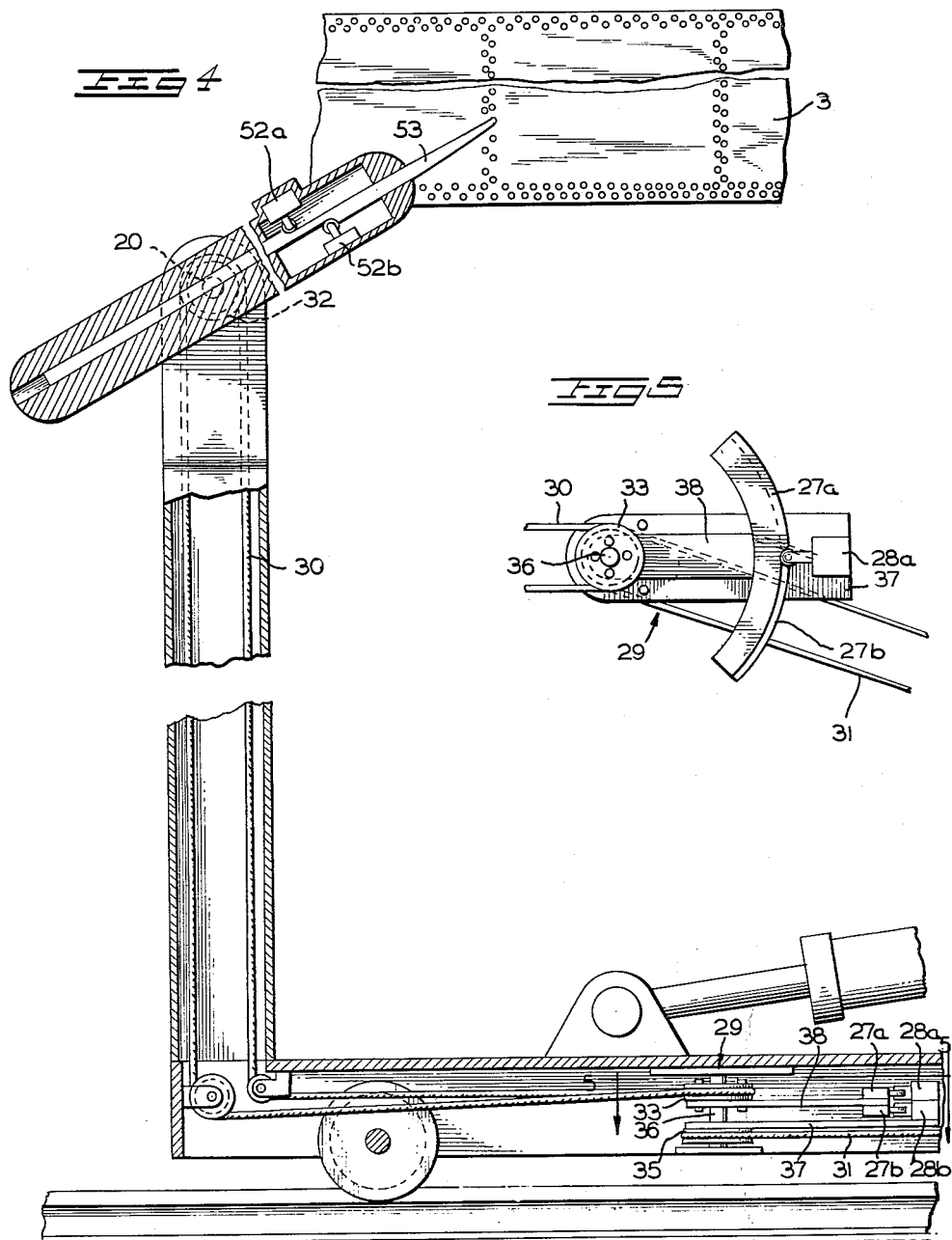

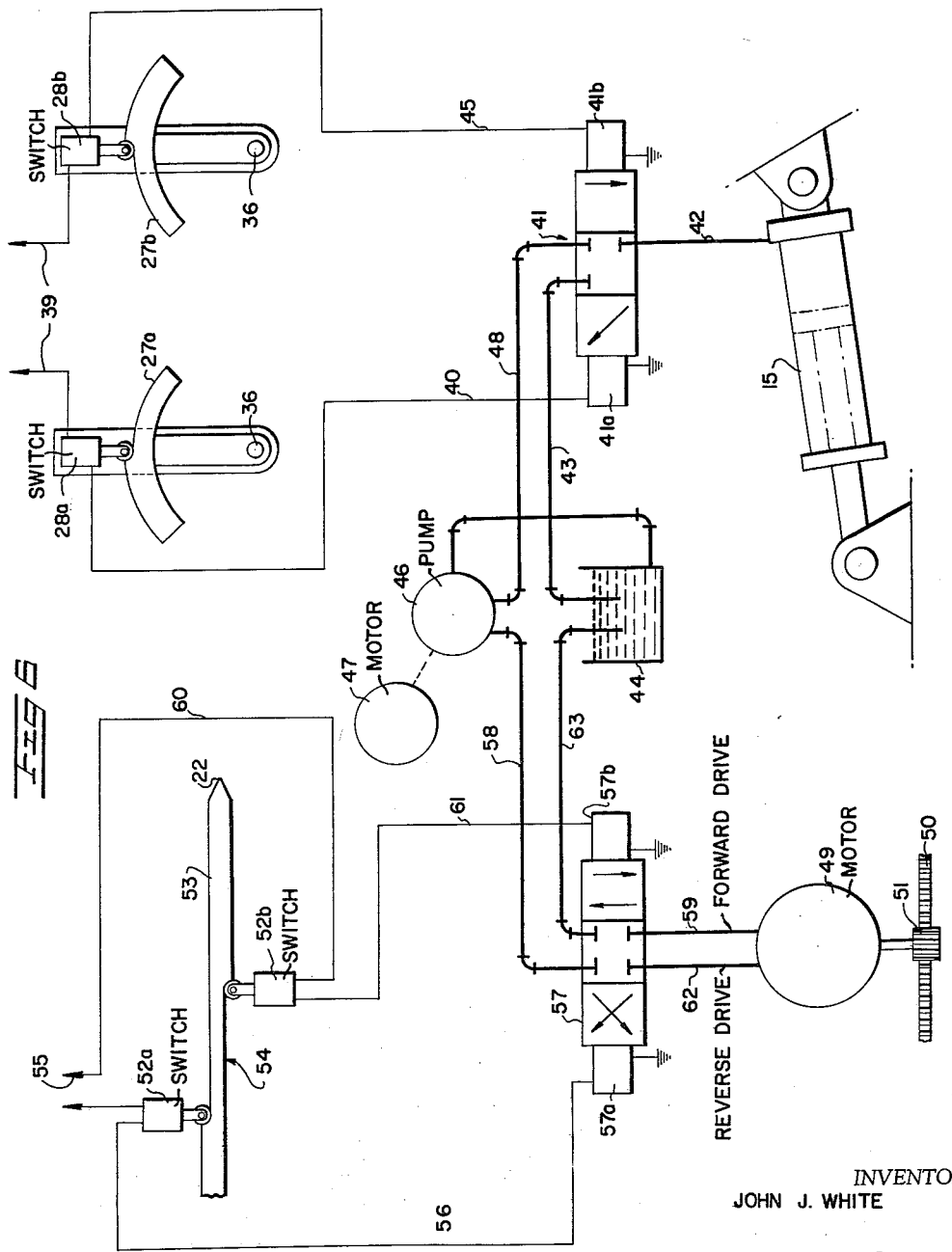

3,093,017
SPAR RIVETING MACHINE
John J. White, Bethesda, Md., assignor to ACF Industries, Incorporated, New York, N.Y., a corporation of New Jersey
Filed Nov. 1, 1960, Ser. No. 66,643
8 Claims. (Cl. 78—49)

A major problem in the fabrication of large structural members with automatic riveting machines is that of positioning a work head with respect to the structure. My invention provides a new and useful solution to this problem wherein a master pattern and the work piece are fixedly disposed and are traversed by combination of translational and arcuate rotational displacements respectively of a position selecting index point followed through servo positioning means by the work head.

Fabrication of aircraft structure with rivet fastening is usually programmed for two types of operation. Smaller pieces, or sub-assemblies, are fastened with automatic riveting machines wherever this is feasible. The cost and time required for each fastening so applied is relatively low. However, the size of sub-structure permissive of economical handling in a fixed yoke riveting machine is limited. Thus for assembly of larger structures the sub-assemblies must be joined by a second type operation, usually by manual riveting in an assembly jig. Manual riveting is a slow and relatively costly operation. Thus there is considerable advantage to be gained from a capability of handling a large work piece in an automatic machine.

A basic requirement for automatic riveting is the provision of substantially supported work heads at corresponding positions on opposite sides of the work piece. This support is usually provided by a rigid frame or yoke, having a throat sufficiently deep to straddle the work piece. For a large work piece or deep yoke, a relatively massive structure must be provided to attain adequate rigidity. Generally such a yoke will be heavier than the work piece so that it is more expeditiously fixed with respect to the factory floor.

Fixing the work head imposes the limitation that work to be handled by the machine must be supportable and positionable in the machine. When this is no longer feasible it is possible to extend the capacity of the automatic machine by reversing the relative mobilities; that is by fixing the work piece and moving the work head relative to it and to the reference frame of the shop floor. Since high head rigidity is still a requirement, it is not generally feasible to manually position the massive work yoke. Power assistance for this function is definitely required. It is to the problem of locating the head of an automatic riveting machine with respect to a stationary jig holding the work piece that my invention provides a unique and exceptionally useful solution.

In brief, the preferred embodiment of my invention provides a wheeled carriage supported on a horizontal linear track. A work yoke containing the riveting heads at one extremity is pivoted about an axle fixedly mounted on the carriage transverse to the direction of the track. A suitable jig is provided to fixedly support the work piece to lie within the space traversable by the work yoke. The work head can then be positioned at any location on the work piece by a given combination of translatory motion parallel to the track and arcuate rotation about the axle. Suitable power drives implement the positioning motions.

To control the positioning actuators, a secondary pivoted indexer is also carried by the translatable carriage. Instead of engaging the work piece, however, the index pointer is set on a pattern which is disposed with respect to the indexing pivot in direct correspondence to the disposition of the work piece with respect to the yoke-supporting axle. The indexing arm is radially extensible from and rotatable about its pivot. If this extension should differ from the set value providing a radial extent equal to that of the work yoke axle to work head distance, a servo-motor will drive the carriage along the track so as to equalize these. Similarly if indexing pointer orientation should differ from that of the work head, a servo-motor will drive the head into coincident orientation.

In operation the operator, riding on the yoke-supporting carriage, will position the index pointer in a hole in the pattern. The translational and rotational servos will then adjust the yoke position and orientation to approach coincidence with those of the index arm. When the positioning is completed, the work is clamped in the head and the necessary machine operations are performed on the work piece. After the work is clamped, the positioning servos are locked so that the operator may reposition the index pointer at the next work site on the pattern while the work cycle is going on. Upon completion, the work piece is released and positioning begins anew, thus starting a new cycle.

It will thus, and from subsequent description, be understood that a primary objective of my invention is the provision of a riveting apparatus as simple and unsophisticated as possible consistent with the desire for high production rate and accurate placement of sound rivets.

It is a further object of my invention to provide a machine which is inherently flexible so that it may be readily adapted to any of a variety of shapes and sizes of fabricated structures.

Another object of the invention is the provision of a fixed work piece and corresponding template pattern and relatively movable work head and positioning indexer.

Still a further object is the location of the work head by a combination of linear translation and arcuate orientation to bring it into coincidence with corresponding location of an index pointer in a template.

It is another object of my invention to permit the operator to retain control of the positioning of rivets by requiring manual selection of each position to be sought by the work head.

It is a further object to permit the operator to select a new site for a rivet concurrently with progress of the head through its work cycle on the previously selected site without disturbing head location during that cycle.

As a further object my invention provides a head positioning system of general utility and versatility and thus readily adaptable to various material-working operations such as drilling, drilling and riveting, punching, punching and riveting, spot welding, stamping, milling and routing.

These and other objects attained as a result of the practice of my invention will be made clear in the following detailed specification taken in conjunction with the drawings, of which:

FIG. 1 is an oblique projection view of the apparatus showing indexing arm, work yoke, and operator's station carried on horizontal rails;

FIG. 2 is a side elevational view of the apparatus;

FIG. 3 is a vertical section along lines 3—3 of FIG. 2;

FIG. 4 is a vertical section along a plane passing through line 4—4 of FIG. 1 and showing a mechanism suitable for index finger position sensing;

FIG. 5 is a horizontal fragmentary sectional view along line 5—5 of FIG. 4; and

FIG. 6 is a schematic diagram of a servo-motor system suitable for control and actuation of the work head.

The general disposition of apparatus components is illustrated in FIG. 1. The work piece, shown by way of illustration here as a webbed spar member 1, is fixed by clamps in a work holding fixture generally designated by reference character 2. The same fixture provides a supporting platform for template 3 which contains a full scale pattern of the locations of fastenings, or other operations to be performed by a work head. Fixture 2 is shown as a doubly flanged beam member 4 supported on its ends by post members 5 which are anchored at one end in the floor 6. In actual installations fixture beam 4 may be of considerable length and additional supports from the building (not shown) may be required to hold work piece and pattern with sufficient rigidity. In the arrangement shown the work piece hangs from the bottom of the support beam 4 from a lower extremity of bracket 7, a plurality of which are provided. This permits the work piece to be traversed by the work head with minimum obstruction from holding jigs. The template pattern, on the other hand, extends above the work piece area from the lower level of beam 4 so as to lie out of the area which can be reached by the work head.

Longitudinal traverse of the stationary work piece and pattern is accomplished by mounting the working elements of the riveter on wheeled dolly 8. Track members 9 mounted on the floor along lines generally parallel to the longitudinal axis of beam 4 constrain the dolly to motion generally parallel the work piece 1. The working elements of the machine, designated generally by reference character 10, are mounted on the radial extremity of a yoke member 11, as best viewed in FIG. 3. These parts and their controls may be one of a variety of types suitable for automatic fastening operations, such as those described in a previous application of the present inventor and Milton Clar, entitled "Riveting Machine," Serial No. 729,463, filed April 18, 1958, and assigned to the same assignee. These parts will operate on a working axis 12 which will generally define the centerline of the fastening which is installed by the machine. Vertical excursion of this working axis is permitted by rotation of work yoke 11 about axle 13 mounted above dolly 8 on trunnion members 14. Force for rotation of the yoke member 11 is provided by a linear hydraulic motor 15 which through pivotal anchor 16 at one end on the platform of dolly 8 reacts on the other through pivotal anchor 17 attached to yoke 11.

Since pattern template 3 is shown positioned above the levels occupied by the work piece 1, an elevated platform 18 is mounted on dolly 8 to provide convenient access to this area by an operator. Positioning of the work head is controlled, in a manner hereinafter to be more fully described, by a servo system which translates dolly 8 and rotates yoke 11 into coincidence with corresponding coordinates of an index finger 19. The index finger is mounted to permit rotation about an axis 20 which is supported atop column member 21 fixed on the platform of the dolly. This axis is positioned with respect to index finger tip 22 and to the pattern 3 identically as axis 13 is positioned with respect to work axis 12 and work piece 1. The operator atop platform 18 manually inserts index finger tip 22 into a hole in pattern 3 and in due course the platform and yoke are driven until the coincidence noted above has been reached.

Power for the riveting head and positioning system is transmitted to the movable platform by an extensible cable arrangement consisting of track member 23 supporting loops of cable 24 from a plurality of slidable hangers 25. Electrical control circuits are housed in the rearward enclosure generally designated by reference character 26.

The essentials of the servo system by which angular orientation of work head 10 is made to align itself with that of index finger tip 22 are shown in FIGS. 2, 4 and 5. Basically the orientations of the two elements are compared by matching orientation of cams 27a and 27b following angular position of one with electrical switches 28a and 28b following angular position of the other. These orientations could be compared at any location; for the machine configuration depicted here a central location is convenient. Pivot sites 20 and 13 and the match site 29 are mechanically linked by pretensioned cables 30 and 31, respectively. Other types of positive mechanical linkage, such as chains or shafting and gearing, could alternatively be employed without departing from the scope of my invention. For the cable or chain system, a drive pulley 32 attached to pivot arm 19 and centered on axis 20 is mechanically linked via cable 30 to driven pulley 33 at the match site 29. Similarly a drive pulley 34 attached to yoke 11 and centered on pivot 13 is mechanically linked via cable 31 to driven pulley 35 at the match site. For proper operation the diameter ratio between pulleys 32 and 33 must be equal to that between pulleys 34 and 35; unit ratios are depicted by way of example.

At the match site 29 both driven pulleys 33 and 35 are rotatable about a common axle 36. For the present example, a radial extension arm 37 carries limit switches 28a and 28b, while an arm member 38 carries a corresponding set of contacting cams 27a and 27b. Best shown in FIG. 6, where the sets are shown separately, a clockwise mis-match of upper cam 27a with respect to switch follower 28a will result in the closing of switch 28a thereby connecting a source of electrical power 39 via line 40 to electrical actuator 41a for hydraulic valve 41. With this actuation of valve 41 the pressure for the linear hydraulic motor 15 is relieved via tubes 42 and 43 by discharge of fluid into sump 44. As a result cylinder 15 is contracted by the thrust from dead weight torque of yoke 11, the work head 10 executes clockwise or downward rotation, and switch 28a is correspondingly rotated to a position which will again de-actuate it.

While this adjustment is going on, switch 28b is riding on the reduced radius sector of cam 27b. However, when the index arm is of a more counterclockwise orientation than yoke 11 (as viewed in FIG. 2) cam 27b will be displaced counterclockwise with respect to switch follower 28b and as a result, power from source 39 is connected to electrical actuator 41b via switch 28b and line 45. With valve 41 actuated in this way, fluid pressure from a pump 46, driven by motor 47, is connected to linear motor 15 via tubes 48 and 42, thereby extending linear motor 15, raising yoke 11 until coincidence with arm 19 is sensed by de-actuation of switch 28b.

A similar control system is provided to accomplish translational positioning of dolly 8. The drive power for the dolly is applied through rotary hydraulic motor 49 (FIG. 2) engaging a linear rack 50, disposed parallel to the supporting rails 9, with a pinion gear 51. This motor is driven so as to displace the dolly, and thus the pivot of index arm 19, in a direction tending to bring the radial distance from pivot 20 to index arm finger 22 into exact coincidence with the prefixed length. For correspondence of coordinate systems between template and work piece pattern, this radius must be identical to that of the work arm. When the preset radius arm length is present neither switch 52a nor 52b will be actuated. If, however, arm 53 is extended, the cam cut in the region designated at 54 will actuate switch 52a, thereby connecting electrical power from a suitable source 55 to electrical actuator 57a via line 56. With fluid valve 57 so actuated fluid pressure from pump 46 is connected via tubes 58 and 59 to drive fluid motor 49 in the forward direction. In FIG. 2 this would correspond to displacement of dolly 8 to the right. When the preset radius is attained, switch 52a is deactuated and motor 49 stops.

For a displacement error of the opposite sign, or an over retraction of arm 53, power is connected to actuator 57b from source 55 via lines 60 and 61. Actuated in this way, valve 57 connects fluid pressure from pump 46 to reverse drive inlet of motor 49 via tubes 58 and 62. For either direction of rotation, a fluid return path to sump 44 is provided by tube 63.

In operation, an operator situated on platform 18 will manually insert finger 22 in a pre-drilled hole in template 3. For maximum accuracy and durability the template may be made of sheet metal. If this hole is not within reach of the excursion limits of pointer 22, the carriage will be driven as long as the pointer is urged toward the point to be located, until insertion in the desired hole is possible. After this, the drives on the carriage and yoke will continue to adjust until coincidence of index pointer and work yoke positions is attained. This condition may be sensed by the cessation of current flow from sources 39 and 55 (FIG. 6). An interlock switch (not shown) may then be released, permitting the riveting or other machine cycle to commence. Once the work piece is clamped, another interlock switch operates to prevent receipt of power from sources 39 and 55. The hydraulic motors 15 and 49 are thus locked in position, fixing the work head, and thus permitting the operator to advance index pointer 22 to a new site preparatory for the next machine cycle. As the work cycle is completed and the work is unclamped, power is again restored from sources 39 and 55 and the machine advances to the new position. In the control system, suitable manual controls are provided which permit the operator to withold automatic operation of either the work cycle or the positioning operation. Separately actuated machine operation control switches 73 are connected through leads 74 to the control panel 26 as indicated in FIG. 3.

It will be obvious to one skilled in the art that stability of the carriage positioning servo will be lost as the pointer orientation approaches ninety degrees from the horizontal. To avoid this condition the yoke is designed with throat depth sufficient to bring the work head to the upper extremity of the work piece with elevation angle less than ninety degrees. This slight disadvantage to the use of combined arcuate and linear positioning displacements is more than outweighed by advantages accruing from the simplicity of yoke support and the improved accuracy and reproducibility with which the work head can be located.

It will further be obvious that an additional central station may be provided elsewhere on the wheeled dolly to permit the operator to guide the positioning of the machine manually without benefit of the template and raised platform. In this way the machine may be positioned for direct alignment with markings on the work piece itself or for random operation.

It will also be apparent to those skilled in the art that the improved and highly effective positioning apparatus of my invention will permit various types of machine operations to be performed. Modification of the head assembly 10 is generally all that will be required. For example, instead of a complete riveting cycle, operations such as drilling, drilling and riveting, punching, punching and riveting, spot welding, stamping, milling and routing might be performed.

I claim:

1. A machine for sequential application of a plurality of rivet fasteners to a work piece, including template pattern means locating in plan the positions at which fasteners are to be applied, means for supporting the work piece and said template pattern means in planes displaced from each other, a carriage member, a linear track guiding said carriage member along a path generally parallel the longest dimension of the work piece, a work head rotatably mounted on said carriage in a way permitting it to traverse the work piece, an index head rotatably mounted on said carriage in a way permitting it to similarly traverse said template pattern means by radial extension and rotation, means for translating said carriage member in a path retracting said index head to its initial radial extent, and means for rotating said work head into orientation coincident with that of said index head.

2. A machine as in claim 1 in which said means for translating the carriage include a rack, a pinion engaging said rack, a hydraulic motor attached to said carriage driving said pinion, a first electric switch member attached to said index head operative upon radial extension of said head to actuate said hydraulic motor in one direction, and a second electric switch member attached to said index head operative upon radial retraction of said head to actuate said hydraulic motor in the other direction, whereby said index head seeks a fixed radial position.

3. A machine as in claim 1 in which said means for rotating said work head include a linear hydraulic motor attached to said carriage so as to apply an orienting torque to said work head, mechanical transmission means for reproducing a corresponding angular orientation of said work head and of said index head, a cam member orientable by said mechanical transmission in correspondence with angular orientation of one of said heads, switch members engageable by said cam member and orientable by said mechanical transmission in correspondence with the angular orientation of the other of said heads, and hydraulic valve means actuated upon loss of coincidence in orientation between said cam and said switch members to drive said hydraulic motor in a direction restorative of coincidence.

4. A machine as in claim 1 including a platform mounted on said carriage to support an operator with convenient access to said index head.

5. A machine for sequential application of a plurality of rivet fasteners to a work piece, including template pattern means locating in plan the positions at which fasteners are to be applied, means for supporting the work piece and said template pattern means in planes displaced from each other, a carriage member, a linear track guiding said carriage member along a path generally parallel the longest dimension of the work piece, a work head rotatably mounted on said carriage in a way permitting it to traverse the work piece, an index head rotatably mounted on said carriage in a way permitting it to similarly traverse said template pattern means by radial retraction and rotation, means for translating said carriage member in a path extending said index head to its initial radial extent, and means for rotating said work head into orientation coincident with that of said index head.

6. A machine as in claim 5 in which said means for translating the carriage include a rack, a pinion engaging said rack, a hydraulic motor attached to said carriage driving said pinion, a first electric switch member attached to said index head operative upon radial extension of said head to actuate said hydraulic motor in one direction, and a second electric switch member attached to said index head operative upon radial retraction of said head to actuate said hydraulic motor in the other direction, whereby said index head seeks a fired radial position.

7. A machine as in claim 5 in which said means for rotating said work head include a linear hydraulic motor attached to said carriage so as to apply an orienting torque to said work head, mechanical transmission means for reproducing a corresponding angular orientation of said work head and of said index head, a cam member orientable by said mechanical transmission in correspondence with angular orientation of one of said heads, switch members engageable by said cam member and orientable by said mechanical transmission in correspondence with the angular orientation of the other of said heads, and hydraulic valve means actuated upon loss of coincidence in orientation between said cam and said switch members to drive said hydraulic motor in a direction restorative of coincidence.

8. A machine as in claim 5 including a platform mounted on said carriage to support an operator with convenient access to said index head.

References Cited in the file of this patent

UNITED STATES PATENTS 2,920,531    Helm _____ Jan. 12, 1960
2,975,661    Coleman _____ Mar. 21, 1961